March 18, 1947. J. C. SHAW 2,417,708
SURGE VALVE MECHANISM
Filed Nov. 19, 1943
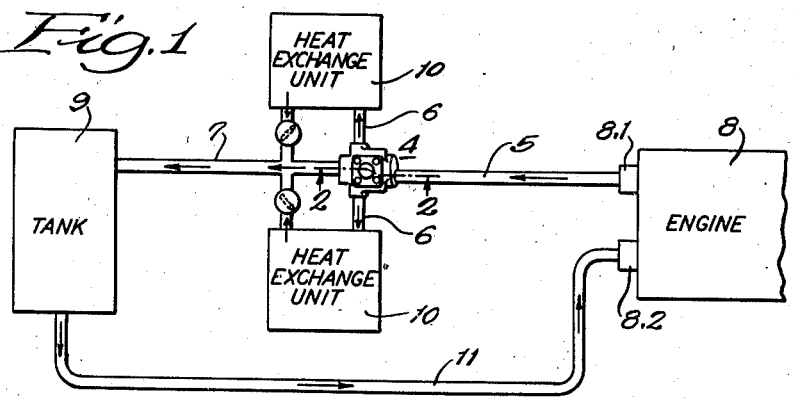
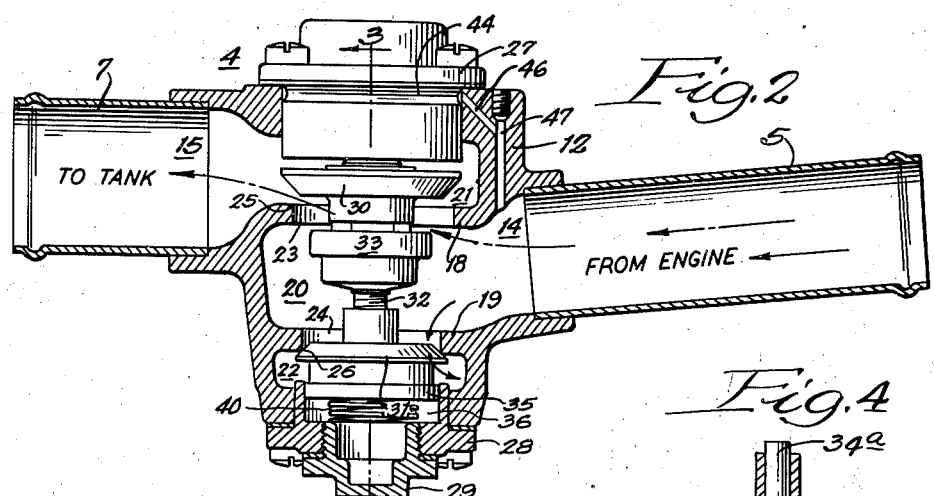
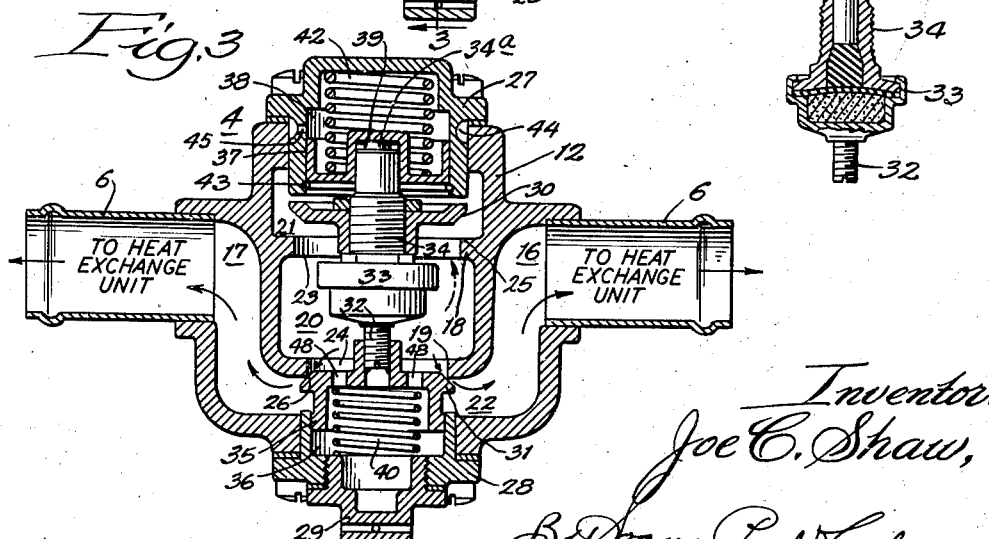
Inventor:
Joe C. Shaw,
Attorneys.

Patented Mar. 18, 1947

2,417,708

UNITED STATES PATENT OFFICE 2,417,708

SURGE VALVE MECHANISM

Joe C. Shaw, Racine, Wis., assignor to Young Radiator Company, a corporation of Wisconsin Application November 19, 1943, Serial No. 510,869

4 Claims. (Cl. 236—34)

This invention relates to valve mechanisms for use with fluid cooling systems especially adapted for cooling the lubricating oil for aircraft type engines.

Oil cooling systems for aircraft engines must be ready for instant and continuous use in extreme temperature conditions, varying from several degrees above 100° F. to 65° to 70° below zero. The simplest type of cooling system involves the use of a heat-exchange unit connected between the engine and an oil supply tank. One of the preferred types of such a heat exchange unit comprises a cylindrical shell wherein is contained a bundle of cylindrical tubes the ends of which are hexagonally expanded so as to hold the tubes in spaced relationship. When the ends of the tubes are bonded together a sealed core is formed around these tubes through which the oil circulates in heat exchange contact with the air flowing through the tubes. The oil is forced through the system by means of one or more pressure pumps. At those times when the weather temperatures are so low as to congeal the oil, and make it extremely resistant to flow, it would be injurious to the heat exchange unit to apply the pressure of the pump to force a movement of the congealed oil therethrough.

The main objects of this invention, therefore, are to provide an improved thermostatically-operable valve mechanism actuated by the temperature of the oil for controlling its flow through or around the heat exchange unit, as may be required by the over-all conditions of weather and engine operation; and to provide a valve mechanism of this kind which is simple and compact in construction, highly sensitive to the temperature conditions of the oil and suitable for use with almost any type of heat exchange unit.

In the specific embodiment of this invention herein shown:

Fig. 1 is a diagrammatic view showing the positioning of a valve mechanism of this type in a cooling system for an aircraft type engine;

Fig. 2 is an enlarged sectional elevation taken on the line 2—2 of Fig. 1;

Fig. 3 is a transverse sectional elevation taken on the line 3—3 of Fig. 2; and

Fig. 4 is a cross-sectional detail of the thermostatic means used to shift the valve mechanism.

In the diagrammatic view (Fig. 1) the valve mechanism 4 is shown connected in a pipe line, with its several branches 5, 6, and 7, arranged for conducting a cooling fluid between an engine 8 and a supply tank 9 either around or through a pair of heat exchange units 10. The branch pipe 5 leads directly from the engine to the valve 4 mechanism whereas the branches 6 lead from the valve to the heat exchange units 10. The branch 7 also leads to the tank 9 directly from the valve mechanism 4 and from the heat exchange units 10. A pipe line 11 leads from the supply tank 9 back to the motor 8, thus completing the circuit. Suitable pumps 8.1 and 8.2 are provided for causing a circulation of the oil through the system. Although, in this diagrammatic view the valve mechanism is shown associated with two heat exchange units it will be understood that a single heat exchange unit could be used. In that case there would be a single outlet rather than twin outlets now shown for that purpose.

The particular embodiment of the valve mechanism 4 herein shown comprises a chambered housing 12 wherein is mounted valve structure 13 adapted to control the flow of liquid from an inlet 14 either to an outlet 15 or to the twin outlets 16 and 17. The housing 12 is provided with a pair of partitions 18 and 19 so formed as to divide the interior of the housing 12 into a central chamber 20, an upper chamber 21 and a lower chamber 22. The chamber 20 communicates directly with the inlet 14, whereas the upper chamber 21 communicates directly with the outlet 15, and the chamber 22 communicates with the twin outlets 16 and 17.

As will be noted from Figs. 1 and 2, the inlet 14 connects with the pipe line branch 5 whereas the outlet 15 connects with the branch 7. The twin outlets 16 and 17 communicate with the respective sections of the branch 6.

The partitions 18 and 19 have formed therein axially-aligned openings 23 and 24 which provide communication between the central chamber 20 and the upper and lower chambers 21 and 22 respectively. A valve seat 25 is formed around the upper perimeter of the opening 23 whereas a valve seat 26 is formed around the lower perimeter of the opening 24.

The upper and lower ends of the housing 12 are closed with end caps 27 and 28 respectively. These caps are secured to the housing by means of cap screws which press the caps down against suitable gaskets. The end cap 28 is equipped with an auxiliary plug 29 which may be inserted or removed independently of the removal of the cap 28.

The valve structure 13 comprises a pair of valve members 30 and 31 rigidly connected together for unified movement by means of a valve-supporting and -shifting member 32—34.

As will be noted the valve members are mounted in opposed relationship to each other so as to co-act with the valve seats 25 and 26 respectively. The two parts 32 and 34, which carry the respective valve members 30 and 31 are connected together to provide an enclosure for the thermostatic element as hereinafter set forth.

The valve member 30 is screwed on a stem 34 for co-action with the valve seat 25. This valve member is designed to control the flow of oil from the inlet 14 to the outlet 15 through the opening 23 in the partition 18.

The valve member 31 is provided with an extension or hollow stem 35 which constitutes a piston slidably mounted within the cylinder 36 formed in the end cap 28. This valve co-acts with the seat 26 for the purpose of controlling the flow of oil from the inlet 14 to the twin outlets 17. A spring 40 acting between the valve member and the plug 29 tends normally to seat the valve member 31 and close communication between the inlet 14 and the twin outlets 16 and 17.

A supporting and positioning means for the valve members 30 and 31 comprises a piston 37 slidably mounted in the cylinder 38 formed in the end cap 27. This piston 37 has a hub 39 recessed to receive the end of the stem 34. A spring 42 normally urges the piston 37 to the lower limit of its movement. Such movement is limited by the shoulder 43 which is in the form of a resilient ring expanded into a suitable groove in the lower end of the cylinder 38. The spring 42, the thermostat 33, and the connection of the valve members 30 and 31 through the parts 32 and 34 are adjusted so that when weather temperatures reduce the oil to such a viscous condition that forcing it through the heat exchange unit might be injurious to that unit, the thermostatic unit 33 acts to hold the valve member 31 against the seat 26 and the valve member 30 out of contact with the valve seat 25. This permits the highly viscous oil to flow through the valve casing from the inlet 14 directly to the outlet 15, thus by-passing the heat exchange units 10.

The springs 40 and 42 in effect suspend the valve members 30 and 31 in place, the positions of the latter relative to their respective valve seats being determined by the action of thermostat 33.

The spring 40 is tensioned so as to seat the valve 31 and unseat the valve 30 when the oil temperature is below a certain predetermined temperature. On the other hand the spring 42 is tensioned below a pressure that would be injurious if applied to the heat exchange units. In other words, this spring serves as a safety means for the heat exchange units. If, for any reason, such as the temperature of the oil in the housing or a defective structural condition, the thermostat 33 should seat the valve 30, when the viscous condition of the oil in the system would result in an undue pressure being created by the pump on the heat exchange unit, this spring 42 would yield and permit at least some of the oil entering the inlet 15 to by-pass the heat exchange units 10 until such time as the viscous condition of the oil in the unit core would permit a flow at a safe pressure.

The thermostat 33 may be of any suitable form, either the conventional bellows type in which a volatile chemical is the motive agent or it may be a type wherein a wax substance with a high coefficient of expansion is used as the motive agent. Fig. 4 of the drawings indicates the use of the latter type. As will be noted the thermostat acts against a piston 34A slidably housed in the stem 34 and bearing against the hub 39 of the piston 37.

The thermostat is mounted in the chamber 20 inasmuch as there is always a flow of oil through that chamber and accordingly will always be immediately affected by the temperature changes in the oil in the system.

In order to secure the proper operation of the valve members 30 and 31, it is necessary to make provision for the fluid pressure in chamber 20 to be applied in effect against the valves equally in both directions. This application of pressure is direct in the case of valve member 31 and indirect in the case of valve member 30, as will be pointed out presently.

The pressure of the oil in chamber 20 is exerted against the valve member 30 through the medium of an orifice 45 (see Fig. 3) connecting the cylinder 38 with a groove 44 formed in the outer periphery of the cap 27 which in turn connects with the inlet 14 through the drill openings or orifices 46 and 47 (see Fig. 2). However, the diameter of the passage 23 is slightly greater than the diameter of the cylinder 38 so that the valve member 30 is in a condition of slight imbalance due to the differential in the force of the oil pressure acting on opposite sides of said valve member. Thus, when the valve member 30 is seated, under the pressure of the thermostat 33, the valve member 30 will respond properly against the action of the spring 42 to a subsequent increasing oil pressure in the chamber 20.

The valve member 31 is provided with apertures 48 which afford communication between the chamber 20 and the cylinder 36, thereby equalizing the pressure on both sides of the valve member 31. However, in this case, the diameter of the passage 24 is the same as the diameter of the cylinder 36 so that the force of the oil pressure acting on opposite sides of the valve member 31 is exactly equal. This puts the valve in perfect balance and insures the movement of the valve member 31 being confined to the pressure differential between the spring 40 and the action of the thermostat 33 under the changing temperature of the oil flowing through the housing 12.

The operation of the valve mechanism herein shown is as follows:

When the oil in the cooling system is at a temperature that permits easy flowing through the heat exchange units the co-action of the thermostat 33 and the springs 40 and 42 would position the valves 30 and 31 opposite that shown in Figs. 2 and 3. Normal communication is then open between the inlet 14, which is connected to the engine 8 by means of the branch line 5, and the twin outlets 16 and 17, which are connected directly to the units 10 by means of the branch lines 6. The thermostat 33 would retain the valves in these positions so long as weather conditions allowed the oil to retain its easy, flowing viscosity.

When weather conditions and engine operation combine to so increase the viscosity of the oil so that to attempt its movement through the heat exchange units might result in injury to those units, the thermostat 33 would act to shift the valve members 30 and 31 into the positions shown in the figures. Under such circumstances, the oil would flow directly from the inlet 14 through the chambers 20 and 21 to the outlet 15, thus completely bypassing the heat exchange units 10.

This condition of high viscosity of the oil that makes it so resistant to flow may often exist when the engine has been idle for some time in low temperatures. When the engine is started up the passing of the oil through the engine naturally steps up the temperature. The thermostat 33 soon begins to react to the increase in oil temperature and slightly retracts the valve member 31 in an attempt to open communication from the chamber 20 through the opening 24 to the twin outlets 16 and 17. At first the opening of the valve member 31 will be sufficient to permit merely a trickle of the warmed oil to move through the pipes 6 to the units 10. This will tend gradually to reduce the viscosity of the cold or congealed oil in the units, and thereby tend to start a movement thereof from the units through the branch 7. As the temperature of the oil tends to rise further, the thermostat 33 will increase the shift of the valve members 30 and 31 until finally the valve member 30 is seated and the valve member 31 is entirely open. This will not occur however, until the oil in the units 10 has been sufficiently warmed to secure a ready circulation of the oil through the units.

Variations and modifications in the details of structure and arrangement of the parts may be resorted to within the spirit and coverage of the appended claims.

I claim:

1. A valve mechanism of the class described comprising, a housing interiorly partitioned to provide a central chamber with which is connected an inlet and wherefrom leads a pair of axially aligned and spaced valve openings communicating with separate housing outlets, a pair of piston-cylinder means arranged in said housing on opposite sides of said chamber in axial alignment with said outlet openings, one of said piston-cylinder means having the diameter of the cylinder different from the diameter of the adjacent valve opening and the other of said piston-cylinder means having the diameter of the cylinder equal to the diameter of the adjacent valve opening, thermostatic means interposed between the pistons of the respective piston-cylinder means so as to be subject to the temperature of the fluid flow through said chamber, valve members for said valve openings connected to said thermostatic means on opposite sides of said chamber and so positioned relative to each other and to said openings that when shifted by said thermostatic means said valves tend to direct the flow of fluid from said central chamber entirely through one or the other or simultaneously through both of said valve openings, resilient means associated with said pistons so as to oppositely react against the expansive action of said thermostatic means, and means providing communication between said housing chamber and both of said piston-cylinder means rearwardly of the respective pistons whereby the valve closing the valve opening adjacent said one piston-cylinder means may be affected also by fluid pressures in said central chamber.

2. A valve mechanism of the class described comprising, a housing interiorly partitioned to provide a central chamber with which is connected an inlet and wherefrom leads a pair of axially aligned and spaced valve openings communicating with separate housing outlets, a pair of piston-cylinder means arranged in said housing on opposite sides of said chamber in axial alignment with said outlet openings, one of said piston-cylinder means having the diameter of the cylinder different from the diameter of the adjacent valve opening and the other of said piston-cylinder means having the diameter of the cylinder equal to the diameter of the adjacent valve opening, thermostatic means interposed between the pistons of the respective piston-cylinder means so as to be subject to the temperature of the fluid flow through said chamber, valve members for said valve openings connected to said thermostatic means on opposite sides of said chamber and so positioned relative to each other and to said openings that when shifted by said thermostatic means said valves tend to direct the flow of fluid from said central chamber entirely through one or the other or simultaneously through both of said valve openings, a spring interposed between each of said pistons and the base of the corresponding cylinder, said springs being relatively tensioned so that one of said valves is normally positioned to close its respective valve opening and the other said valve is normally positioned to open its respective valve opening, and means providing communication between said housing chamber and both of said piston-cylinder means rearwardly of the respective pistons whereby the valve closing the valve opening adjacent said one piston-cylinder means may be affected also by fluid pressures in said central chamber.

3. A valve mechanism of the class described comprising, a housing interiorly partitioned to provide a central chamber with which is connected an inlet and wherefrom leads a pair of axially aligned and spaced valve openings communicating with separate housing outlets, a pair of piston-cylinder means arranged in said housing on opposite sides of said chamber in axial alignment with said outlet openings, one of said piston-cylinder means having the diameter of the cylinder less than the diameter of the adjacent valve opening and the other of said piston-cylinder means having the diameter of the cylinder equal to the diameter of the adjacent valve opening, thermostatic means interposed between the pistons of the respective piston-cylinder means so as to be subject to the temperature of the fluid flow through said chamber, valve members for said valve openings connected to said thermostatic means on opposite sides of said chamber and so positioned relative to each other and to said openings that when shifted by said thermostatic means said valves tend to direct the flow of fluid from said central chamber entirely through one or the other or simultaneously through both of said valve openings, and resilient means associated with said pistons so as to oppositely react against the expansive action of said thermostatic means, said valve associated with said other piston-cylinder means having apertures formed therein to provide communication between said central housing chamber and the respective piston-cylinder means rearwardly of the piston, said housing and the cylinder of said one piston-cylinder means being channeled and apertured to provide communication between said central housing chamber and the respective piston-cylinder means rearwardly of the piston whereby the valve closing the valve opening adjacent said one piston-cylinder means may be affected also by the pressures in said central chamber.

4. A valve mechanism of the class described comprising, a housing interiorly partitioned to provide a central chamber with which is connected an inlet and wherefrom leads a pair of axially aligned and spaced valve openings communicating with separate housing outlets, a valve member for each of said valve openings, thermostatic means supporting said valves for axial movement relative to said openings and subject to the temperature of the fluid flow through said chamber so as to direct the fluid flow from said central chamber entirely through one or the other or simultaneously through both of said valve openings, piston-cylinder means arranged on opposite sides of said valves with the cylinder of each connected to said thermostatic means for movement therewith, one of said piston-cylinder means having the diameter of the cylinder less than the diameter of the adjacent valve opening and the other of said piston-cylinder means having the diameter of the cylinder equal to the diameter of the adjacent valve opening, a spring interposed between each of said pistons and the base of the corresponding cylinder, said springs being relatively tensioned so that the valve associated with the piston of said other piston-cylinder means normally closes the adjacent valve opening and normally retracts the valve associated with said one piston-cylinder means from the adjacent valve opening, and means providing communication between said housing chamber and both of said piston-cylinder means whereby the valve for the opening adjacent to said one piston-cylinder means may be affected also by pressure changes in said central chamber.

JOE C. SHAW.

REFERENCES CITED

The following references are of record in the file of this patent:

UNITED STATES PATENTS

| Number | Name | Date |
|---|---|---|
| 1,223,079 | Lammert | Apr. 17, 1917 |
| 2,275,576 | Ware | Mar. 10, 1942 |
| 2,279,285 | Worth | Apr. 7, 1942 |
| 854,450 | Bartlett | May 21, 1907 |
| 1,873,769 | Lang | Aug. 23, 1932 |
| 2,353,577 | Magrum | July 11, 1942 |

FOREIGN PATENTS

| Number | Country | Date |
|---|---|---|
| 194,366 | Brit. | Mar. 5, 1923 |
| 419 023 | Ger. | Sept. 26, 1925 |
| 421,900 | Brit. | Jan. 2, 1935 |
| 547,350 | Brit. | Aug. 24, 1942 |
| 662,977 | Ger. | July 26, 1938 |

OTHER REFERENCES

Sarco, Catalog Sheet, A. I. A. File 29-D, Sarco No. 140, published June, 1936, by the Sarco Co. Inc., 188 Madison Ave., N. Y. C. (2 pages).